United States Patent [19]

Schifftner

[11] Patent Number: 6,007,055
[45] Date of Patent: *Dec. 28, 1999

[54] GAS AND LIQUID CONTACT APPARATUS

[76] Inventor: Kenneth C. Schifftner, 1602 Linda Sue La., Encinitas, Calif. 92024

[*] Notice: This patent issued on a continued prosecution application filed under 37 CFR 1.53(d), and is subject to the twenty year patent term provisions of 35 U.S.C. 154(a)(2).

[21] Appl. No.: 08/999,253

[22] Filed: Dec. 29, 1997

[51] Int. Cl.⁶ .................................................. B01F 3/04
[52] U.S. Cl. .................... 261/79.2; 96/297; 96/302; 96/321; 96/326; 261/106; 261/111
[58] Field of Search ........................ 96/296, 297, 302, 96/321, 326, 366, 367, 368, 389, 370; 261/79.2, 103, 106, 109, 110, 111

[56] References Cited

U.S. PATENT DOCUMENTS

| | | | |
|---|---|---|---|
| 907,769 | 12/1908 | Fuller | 261/79.2 |
| 1,516,187 | 11/1924 | Hanson | 261/106 |
| 2,143,016 | 1/1939 | Kleinschmidt | 96/296 |
| 2,224,429 | 12/1940 | Fisher | 261/79.2 |
| 2,453,447 | 11/1948 | McKeown | 96/297 |
| 2,809,820 | 10/1957 | Stoops | 261/106 |
| 2,817,415 | 12/1957 | Sykes | 261/79.2 |
| 3,233,879 | 2/1966 | Mitchell | 261/79.2 |
| 3,669,425 | 6/1972 | Copeland | 261/79.2 |
| 3,675,396 | 7/1972 | Hawryluk et al. | 261/79.2 |
| 4,432,914 | 2/1984 | Schifftner | 261/111 |

FOREIGN PATENT DOCUMENTS

| | | | |
|---|---|---|---|
| 493232 | 2/1976 | U.S.S.R. | 261/110 |
| 625730 | 9/1978 | U.S.S.R. | 261/110 |
| 737769 | 6/1980 | U.S.S.R. | 261/79.2 |
| 829124 | 5/1981 | U.S.S.R. | 261/79.2 |

Primary Examiner—C. Scott Bushey
Attorney, Agent, or Firm—W. Patrick Quast, Esq.

[57] ABSTRACT

A gas and liquid contact apparatus is disclosed having a vertically orientated containing vessel including a sidewall. At least one grid assembly is positioned within the containing vessel transverse to and concentric about a vertical center line of the vessel. Liquid and gas are injected into the vessel at specified flow rates whereby a fluidized zone results. Various techniques are disclosed for rotating the fluidized zone resulting from the interaction of the gas and liquid in the direction of the Coriolis rotational effect at the geographical point of use of the apparatus.

10 Claims, 7 Drawing Sheets

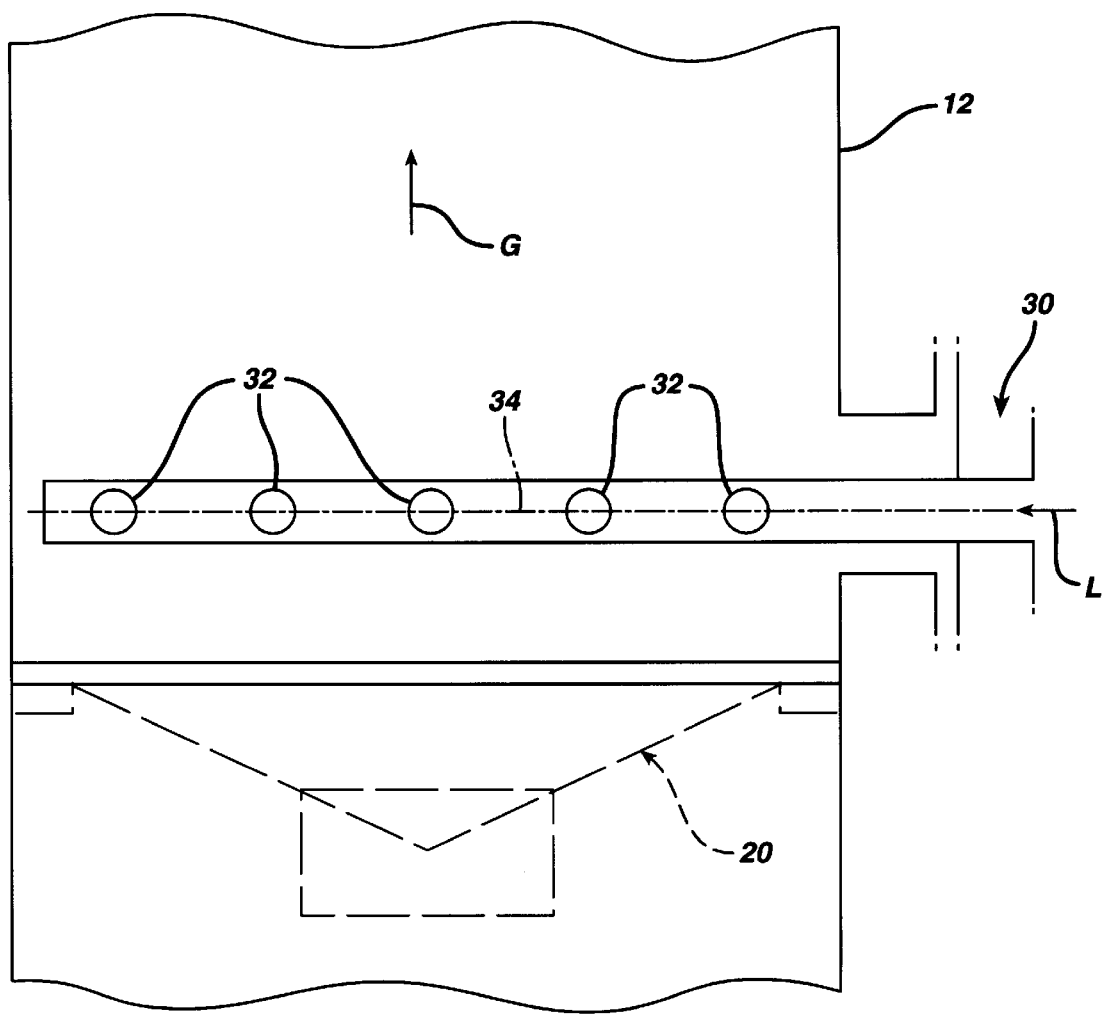

GAS AND LIQUID CONTACT APPARATUS

FIELD OF THE INVENTION

This invention describes a gas and liquid contact apparatus for the treatment of a gas stream, that reduces the energy input required by the apparatus by exploiting the Coriolis effect to enhance the intended consequences of the treatment, such as the removal of solid or liquid particles or soluble gaseous constituents of the gas stream.

BACKGROUND OF THE INVENTION

Previous gas scrubbers have utilized commonly known forces such as impaction, interception, diffusion and phoretic forces to assist in the removal of suspended contaminants or absorb gases from gas streams. These conventional scrubber columns have in general, operated at low gas velocities such that so-called "plug" flow was assumed to exist. For example, packed tower scrubbers operate at 4–5 feet/second; tray towers in the range of 6–8 ft/sec. and, spray tower scrubbers at approximately 8 ft/sec. In an effort to make these devices more compact and less expensive, gas velocities have been increased in recent years.

Tray scrubbers have suffered from distribution problems, thus requiring weirs, downcomers, baffles and other problem-causing internal devices. Packed towers require liquid distributors, gas injection grids, packing and other materials, all of which cause an unnecessary resistance to air flow, while reducing the overall efficiency and gas handling capacity of the scrubber system.

Fluidized bed type gas cleaning devices, in contrast, operate at higher gas velocities and use the motion of the gas stream as it passes through a dispersed liquid to generate a high liquid to gas surface area. Contaminant gases then diffuse to the liquid surface at which point they are absorbed and removed from the gas stream. Numerous studies have shown that increasing the surface area of the liquid and agitating the contact zone enhances the transfer of the gas into the liquid. We see this every day when we stir(agitate) things in order to better mix them.

The inventor herein secured protection for a revolutionary gas scrubber in U.S. Pat. No. 4,432,914. This is known in the engineering community as the catenary grid scrubber design.

This is an improved gas-liquid contact device which utilizes a specially contoured, free hanging catenary grid member(s) interposed in the gas flow within the device. It recognizes the fact that gas does not flow as a flat "plug" through a vessel. Instead, the gas flow forms a parabolically shaped pressure front which has velocities greater in the center of the vessel, diminishing to zero at the wall. The patent describes a catenary grid design which approximates the mirror image of the velocity pressure profile of the gas stream. When scrubbing liquid is injected free flow onto the upper surface of the grid and gases are directed in a counter flow direction at the design velocity, the liquid "fluidizes" (or ebulates) creating an area of great turbulence and mixing. The result was that the catenary grid scrubber achieved high efficiency in both particulate removal and gas absorption operating at gas velocities on the order of 18 ft/sec.

It has been observed however, that this catenary grid scrubber design has certain deficiencies. These shortcomings include, but are not limited to, the following:

1. the fluidized (ebulating) zone can become unstable, with openings forming through which contaminants can pass;
2. the design makes it difficult to make in replaceable format (to retrofit existing towers);
3. it typically has an open area of only 40–80% on any horizontal plane and therefore exhibits a higher than optimum pressure drop;
4. it demonstrates limited gas volume turndown (typically 10–25% maximum);
5. it runs at vertical velocities limited by the draining capacity of the grid; and,
6. it does not induce significant horizontal components into the gas stream to aid in particle collection through increased impaction into the liquid.

It is widely known that the total energy input to a gas cleaning device largely determines its particulate removal performance. This is generally called the "equivalent energy theory". The greater the energy input, the greater the collection. The practice to date has involved the use of "man made" energy inputs provided either by moving the gas (velocity pressure) using a fan or similar device or by moving the liquid (pumping pressure) or combinations thereof. One way to maximize the efficiency of a gas scrubber, would be to use alternative low cost "natural" energy sources; or to use the latter as a supplemental means to augment the man-made sources. One of those natural "sources" is the apparent, or inertia force known as the Coriolis force or as the deflecting, or deviating, force due to the acceleration caused by the rotation of the Earth itself.

The Coriolis effect, or force, is named after the French engineer and physicist Gaspard Coriolis. This force affects an object moving in a rotating system (such as the earth), while being influenced by Newtonian forces when considered in a rectangular coordinate system. The Coriolis effect is sometimes called a "fictitious" force because it must be included mathematically in describing movement in a rotating system, though it is less evident physically.

Mathematically, the magnitude of the horizontal component of this inertia force per unit mass is given by the expression:

$$\text{Coriolis Force} = 2\omega \sin \phi v,$$

where $\omega$ is the angular velocity of the earth; $v$ is the speed of the body's motion;

and $\phi$ is the earth's latitude.

For a given speed, the Coriolis force is therefore at its maximum, $2\omega v$, at the poles, and at its minimum, zero, at the equator. It acts at right angles to the radial motion of the object. Since it does not act in the direction of motion, it does not serve to speed up or slow down the object. It acts as an "inertia" force, establishing a resistance to any subsequent change in the object's motion.

Though the Coriolis Effect is a naturally occurring effect at all areas of the earth except the equatorial area, it is a subtle force. We can experience it personally when we walk on the surface of a rotating carousel. It is most noticeable in everyday life when water flows down a drain. A spinning vortex will form as the water drops down the drain. The relatively heavy water prefers to take a spinning motion rather than fold onto itself in part by the Coriolis Effect curving the net liquid flow of the stream furthest from the equator. The energy expended in spinning the liquid follows Newton's laws of motion in that the rotational force is related to the mass of the component in motion (i.e. the water) from $F=ma$, where m=the mass and a=the acceleration of that mass.

The invention uses the naturally occurring Coriolis effect to enhance the spin of water in a scrubber and thereby increase its particulate removal capability and impart greater stability to the fluidized zone at the higher operating gas velocities with minimum input of "man made" energy. The gas flow's energy is first used to create a "fluidized" or ebulating zone of liquid and thereafter the liquid-gas zone is caused to spin by harnessing the "natural" Coriolis force. The vertical component of the moving gas supports the ebulating zone and a special spin inducer helps control the spin of the zone by providing slight resistance to flow in an outward direction (much like the basin of a sink helps to control the vortex created by draining water). The stability is enhanced due to the polar moment of inertia which results from the rotating fluidized zone about a pivot axis. This is the same as the stability exhibited by a rotating top.

The Coriolis scrubber is designed to permit the swirling action to occur in a controlled ebulating zone through which gas or gases may pass. The spinning motion is intended to create a vector component of the velocity of the particle and that of the liquid such that the particle must move sideways in order to avoid capture. The particle however, given its inertia, tries to move straight ahead. This swirling action imparts a force on the particle which otherwise would not be available. The swirling action, most importantly, is created without excess mechanical input. The force of gravity and the rotation of the earth impart the motion.

The ebulating bed in the Coriolis effect scrubber (CES) is significantly different than the fluidized bed created in the catenary grid scrubber. In the latter, the gases are caused to flow through a curved wire mesh grid. This grid helps compensate for the velocity pressure profile of the moving gases. The gas velocity is essentially all vertically upward. The zone above the grid is basically a random, turbulent zone wherein the gases move axially up the tower. In the CES, however, no such wall to wall velocity pressure profile exists. Instead, the gases and/or the scrubbing liquid are caused to spin through the introduction methods of the liquid and/or gas and a central drainage area that helps induce the Coriolis driven swirl. Since a fluidized or ebulating bed is produced with a density far less than that of water (about $\frac{1}{10}$th of that of water), and the Coriolis effect is reduced, it is still significant.

The present invention reduces or eliminates the non-uniform (random) mixing problem that can sometimes occur with the caternary grid and provides needed stability to the fluidized zone. It also provides greater solids separation given both the swirl induced centrifugal force plus impaction.

It also has superior droplet control since the liquid droplets are thrown towards the wall with few passing directly up the tower. In mass transfer devices, this effect is seen in devices which spin liquid/droplet streams in order to separate them. If the stream is given a tangential velocity, let's say in a vertical cylindrical vessel, it becomes a rotating system. Liquid droplets are affected by the Coriolis acceleration tending to be more easily separated if the cyclonic separator has a counterclockwise rotation north of the equator. The whirlpool occurring at the conical base of the separator will also separate better if allowed to spin in this same direction.

It is therefore a primary object of this invention to provide a mechanism for harnessing the "free" energy of the rotation of the earth to enhance particulate and contaminant gas control in higher gas velocity mass transfer devices.

It is also a principal object of the present invention to provide a gas and liquid contact apparatus which is a compact and energy efficient gas absorption and particulate removal device.

It is yet another object of this invention to provide a highly reliable apparatus for applications where the gas stream or liquid stream may contain components that could plug other designs in that the instant invention has an extremely open grid mesh design which resists plugging from gas borne or liquid borne solids.

It is still another object of this invention to provide an apparatus that is simple in design and operation with absolutely no moving parts.

Yet another object of this invention is to provide a device that has exceptional gas handling or throughput capability with over 4–6 times the gas handling capacity of most other scrubbers.

SUMMARY OF THE INVENTION

A gas and liquid contact apparatus is disclosed comprising a vertically orientated containing vessel including a sidewall. At least one grid assembly is positioned within said containing vessel transverse to and concentric with a vertical center line of the vessel. Liquid and gas are injected into the vessel at specified flow rates. Various techniques are disclosed for rotating the fluidized zone resulting from the interaction of the gas and liquid in the direction of the Coriolis rotational effect at the geographical point of use of the apparatus.

BRIEF DESCRIPTION OF THE DRAWINGS

FIG. 2 is an elevation view of a typical header used to introduce liquid into the apparatus of the present invention.

DESCRIPTION OF PREFERRED EMBODIMENTS

General

The Coriolis Effect scrubber basically consists of four parts:
1. a containing vessel;
2. a grid assembly that helps define the rotating, ebulating (fluidized) zone above its surface;
3. a liquid injection device (headers); and,
4. an inducer means to start, sustain and control the Coriolis Effect induced swirling motion.

Containing Vessel

The general configuration of the device including the invention is that of a vertical cylindrical tower 10A or 10B, (see FIGS. 3A, 3B, 7A and 7B). The tower, includes a vertical, containing vessel 12, a gas inlet 14A or 14B, (tangential or radial—see below), a droplet (entrainment) control stage 16, a gas outlet 18, the grid assembly section 20 and liquid inlet(s) 30. The operation is counterflow, i.e., gas up, liquid down.

Grid Assembly Design

Figure 1A:
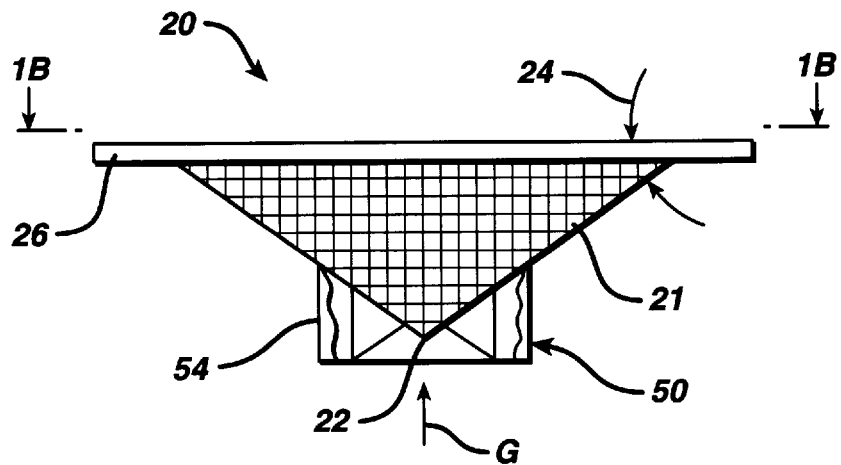
FIG. 1A and FIG. 1B is an elevation and plan view of a typical grid assembly as used in the present invention.
Figure 1B:
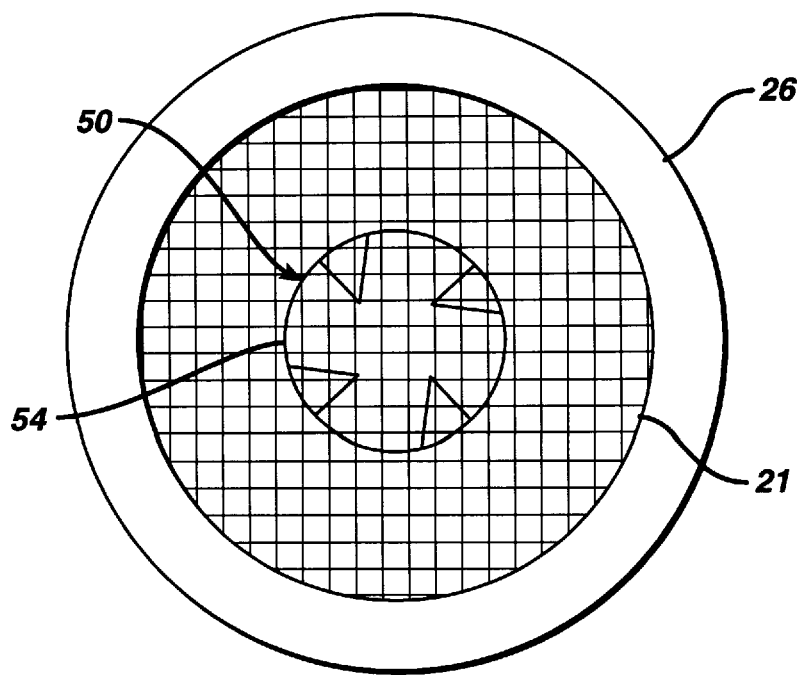

The grid assembly 20 (see FIGS. 1A and 1B) can be a mesh 21 or perforated plate shaped typically in the form of a cone whose apex 22 points into the ascending gas stream. The apex may either be open (see Inducers, below) or in the form of a point. The grid mesh 21 typically is at least 90% open on any horizontal plane to reduce the possibility of plugging with solids. This means that the mesh or perforated plate would be approximately 50–80% open when laid flat.

The grid mesh may be flexible or rigid. The materials of construction may be plastics, metals or other formable or moldable materials. The grid mesh typically is 1/8" thick but at should be at least 1/16" thick for structural reasons. If flexible, the grid mesh is designed to be rolled up, passed through an access door in the containing vessel, and be deployed and secured once in position in the vessel.

The grid assembly may include two, grid mesh or perforated plate layers. If two layers are used, a ring spacer of approximately 1" in height is inserted between them to prevent their touching. The ring spacer would be concentric with the vessel and would have a diameter equal to approximately the grid radius.

The grid mesh cone angle 24 should be at least 5 degrees from the horizontal (an included angle of 170 degrees) with an angle of 10–40 degrees from the horizontal (100 to 160 degrees included angle) preferred. Tests to date have shown that the deeper the grid cone, and the greater the grid diameter, the more rapid the rotating effect imparted to the fluidized zone. The smaller the included angle, the deeper the cone, the greater the rotating effect. Also, tests to date have shown that a cone angle of approximately 30 degrees (120 degree included angle) provides the best observed operation.

The grid assembly(ies) may be attached to the containing vessel through the use of an internal supporting ring to which the grid mesh is bolted, welded, or pinned; or, to a body flange 26 wherein the flange is captured between the body flanges of the vessel (much like an orifice plate). The vertical centerline of the grid assembly is colinear with the centerline of the containing vessel.

The grid assembly can also be an individual "stovepipe" shaped module and then mounted on a tubesheet in the tower. These modules would be made in a diameter small enough to pass through a side access manhole in the tower, then be tilted vertically and mounted into the tubesheet in the vessel. Each module would contain at least one grid and one swirl inducer(see below).

There can be more than one grid assembly, each including the elements described above. One assembly or the lowest of a plurality of these assemblies is positioned approximately 1/2 to 2 vessel diameters above the gas inlet duct horizontal centerline. For multiple grid assemblies the spacing between any two is controlled by the consideration of the distance necessary to create a specific fluidized zone and to keep it separate from a zone above.

Headers

The liquid can be introduced in at least three (3) ways:
1. above the grid assembly using horizontal header(s) 30 (FIG. 2) that discharge the liquid, horizontally, at under 8 feet/sec;
2. above or below the grid assembly using a low pressure (under 15 psig), internal mixing swirl nozzle (not shown); or,
3. tangentially at the rim of the grid assembly (not shown).

The liquid can be introduced at any one or all of the grid assemblies.

The standard header assembly 30 (see FIG. 2) including horizontally orientated straight header(s), typically are secured to the vessel sidewall and extend across to the opposite side. Header liquid flow rates of 4–8 feet/sec. are typically used along with hole velocities of 4–6 feet/sec. The holes 32 may be equally spaced or staggered to produce a uniform pattern of liquid above the grid assembly. Multiple headers 30 may be evenly disposed in a plane across the vessel to further achieve the uniform pattern of liquid above the grid.

The header(s) is orientated so that it is no greater than 1/4 of the spacing between grid assemblies (for multiple grid assemblies) and placed above the grid assembly which it is irrigating. The header centerline 34 is typically 4–6" above the grid assembly it serves.

Internal mixing, full cone, swirl type nozzles or similar spray pattern nozzles can also be used to spray up or down onto the grid assembly. If they spray onto the grid assembly from above or below, they must use a swirl pattern that is in the direction of the Coriolis rotation so that the momentum of the liquid stream is in the rotational direction influenced by the Coriolis effect, counterclockwise North of the equator and clockwise South of the equator.

Spray headers must produce a spray whose velocity approximates that of the rotating gas. This means that droplet velocities of 16–30 feet/sec should be used. Higher velocities in the direction of gas flow tend to waste energy; and high velocities counter to the gas flow tend to reduce the rotational or swirling effect. This means that low liquid pressure spray headers (below 10–15 psig) work best. The headers may be fixed to the vessel wall or be designed to be removed by bolting them to access doors. The spray should commence from the centerline of the vessel so that all rotational effects pivot around the swirl inducer apex.

If tangential liquid inlets are used, they should be open pipes and have a port velocity of 4–8 feet/sec. One header pipe should be used for every 24–36" of circumferential length of grid (measured at the vessel wall) so that a uniform distribution results. They too are positioned between grid assemblies in a multiple grid assembly system at approximately 1/4 the spacing between the assemblies and typically 4"–6" above the grid assembly they serve. They should be oriented in the rotational direction of the Coriolis Effect. The motion of the liquid tangentially is diverted over the grid in a curved path as influenced by the Coriolis Effect thereby causing the ebulating bed to slowly rotate as it drains.

Swirl Inducer

As noted above, the fluidized or ebulating bed produced in a higher gas velocity mass transfer contact apparatus has a density far less than that of water (about 1/10th of that of water), so that the Coriolis effect is further reduced. As a result, it has been found that it is necessary to induce the swirling effect and provide a pivot point around which the swirl can be maintained in order to control the rotation. This is accomplished using swirl inducer means. It has been found that rotating either the gas or the liquid causes the entire fluidized bed to swirl or rotate. This combined rotation is apparently caused by the relative viscosity of the components. The gas and liquid mixture, though ebulating, tends to move in the same direction, together, though the zone is bubbling (ebulating) randomly. The centerline of the pivot tube portion of the inducer acts as an axis around which the ebulating bed rotates, thereby producing the greater zone stability.

At least four types of swirl inducer means can be used:
1. tangential gas inlet to the vessel (swirls gas);
2. centrally mounted, radial outward vanes (swirls gas);
3. centrally mounted radial inward vanes (swirls draining liquid); or, a 4. centrally mounted vertical tube.

In certain applications, there may be a benefit to combining two or more of the swirl inducer means.

The tangential gas inlet device 10A(see FIG. 3A) uses a gas inlet duct 14A mounted tangential to the vessel wall. The swirl is induced by the gases entering the vessel at speeds of 45–200 feet/second. Where standard ductwork is employed, the inlet gas enters at 35–60 feet/sec and its path is caused to curve given the presence of the vessel wall. The gas flows upward inscribing a helical type path. The gas inlet centerline 11 is approximately one vessel diameter from the bottom of the lowest grid asseembly, but may be closer or farther away from the grid assembly depending upon the vessel design.

Figure 4A:
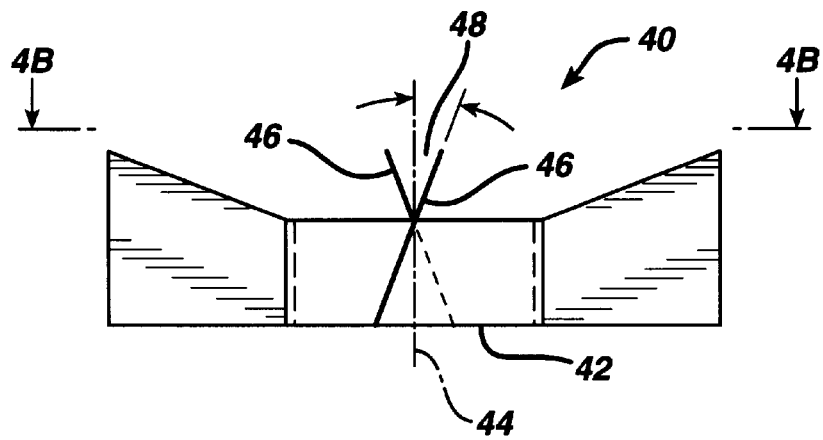
FIGS. 4A and 4B are an elevation and top plan view of a gas swirl inducer for use in the apparatus of the present invention.
Figure 4B:
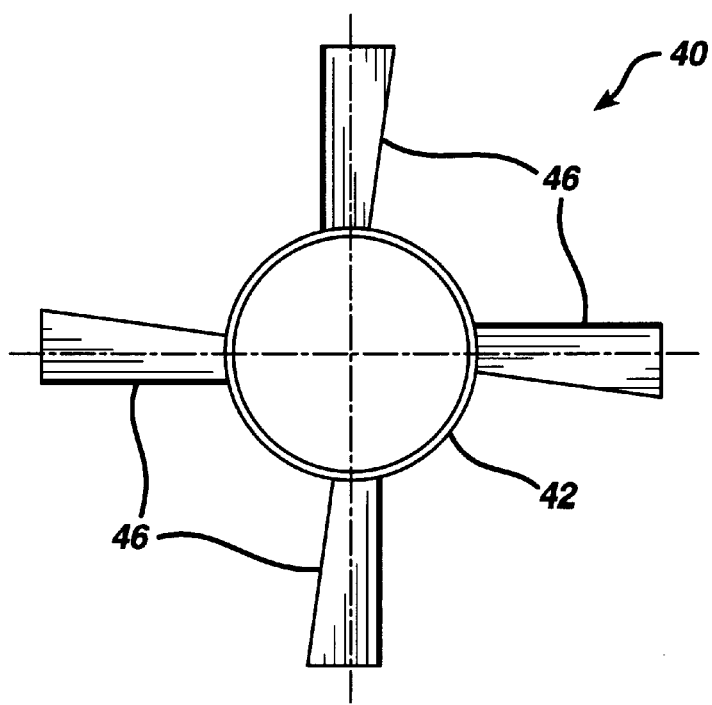

The centrally mounted, radial outward vane gas swirl inducer means 40, (see FIGS. 4A and 4B) includes a vertical pivot tube 42 approximately ⅒th to ⅜th of the total grid diameter fixed to the apex zone of the grid such that the centerline 44 of the inducer pivot tube 42 and the vertical centerline of the grid assembly are coincidental. Its purpose is to induce a swirl in the gas rising towards the grid. A plurality of equally spaced vanes 46 extend radially outward from the swirl inducer pivot tube 42 towards the vessel wall. Each vane is inclined at least 5 degrees in the direction of the gas flow but not more than 60 degrees from the vertical such that the gas flow rising vertically in the vessel is deflected by the vane in a counterclockwise rotation (as viewed from above) North of the equator, and a clockwise rotation South of the equator. The vanes extend from the vertical tube at least halfway to the vessel side wall, though they may be designed to extend fully to the wall. The tube is equipped with not less than three (3) radial blades 46.

Figure 5A:
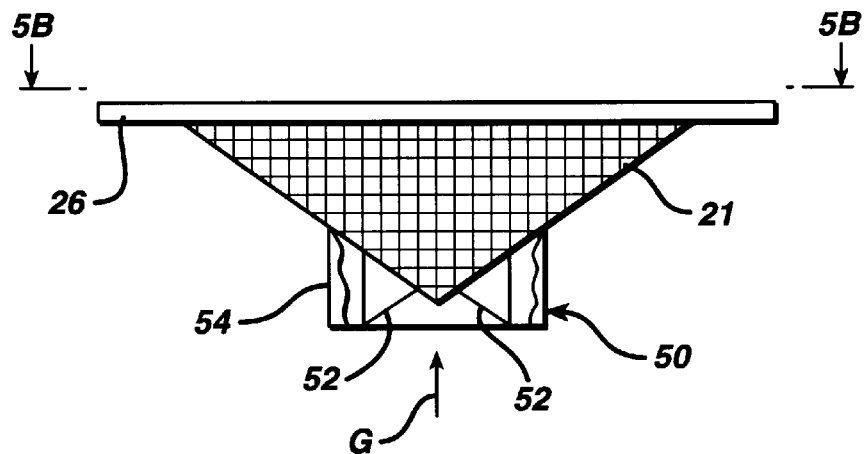
FIGS. 5A and 5B are an elevation and plan view of a grid assembly including a liquid spin inducer for the apparatus of the present invention.
Figure 5B:
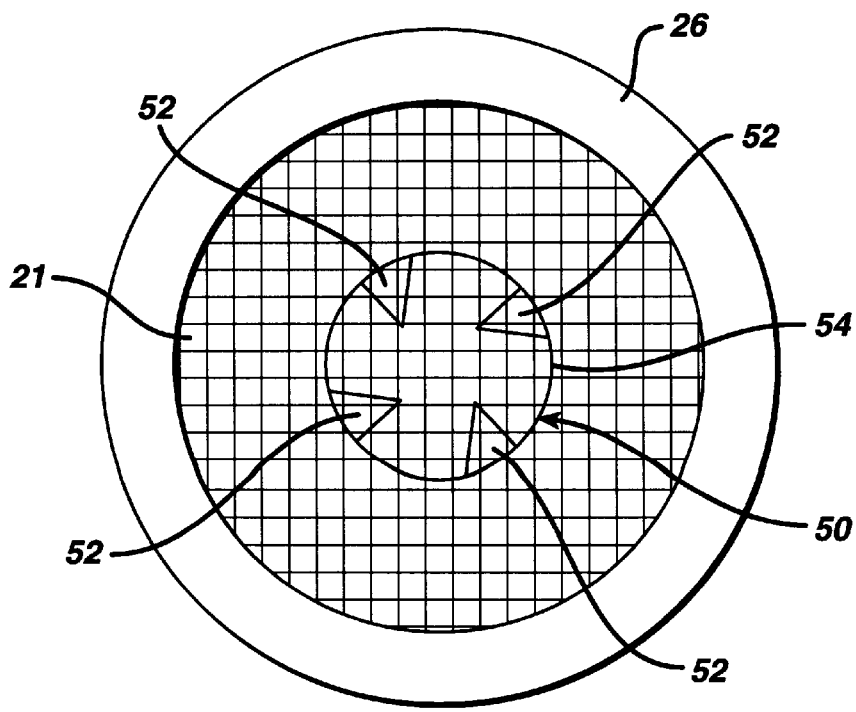

The centrally mounted, radial inward vane liquid swirl inducer 50 (see FIGS. 5A and 5B) is configured as the above but uses vanes 52 positioned on the inside of the vertical pivot tube 54. Its purpose is to induce a swirl in the liquid descending from the grid above. These vanes cause the descending liquid to swirl counterclockwise North of the equator and clockwise South of the equator. The vanes can be made by cutting slots in the tube 54 and bending the tube material (if malleable) inward to form a vane with an angle of attack of at least 5 degrees a nd not more than 60 degrees from the vertical. The vanes extend into the tube not more than ⅔rds of the radius of the tube (they do not meet in the center). If the vanes meet, they can disrupt the spinning effect of the descending liquid and possibly become plugged with solids that may be present in the gas or liquid streams. The inducer can be attached to the grid by welding or bolting but must be firmly attached in position in order to control the swirling action of the grid.

Inducers incorporating inwardly or outwardly directed vanes used in applications near the equator must use larger size vanes and/or higher angles of attack to purposely direct the gas or liquid flow in a common direction since the Coriolis effect is reduced.

Figure 6:
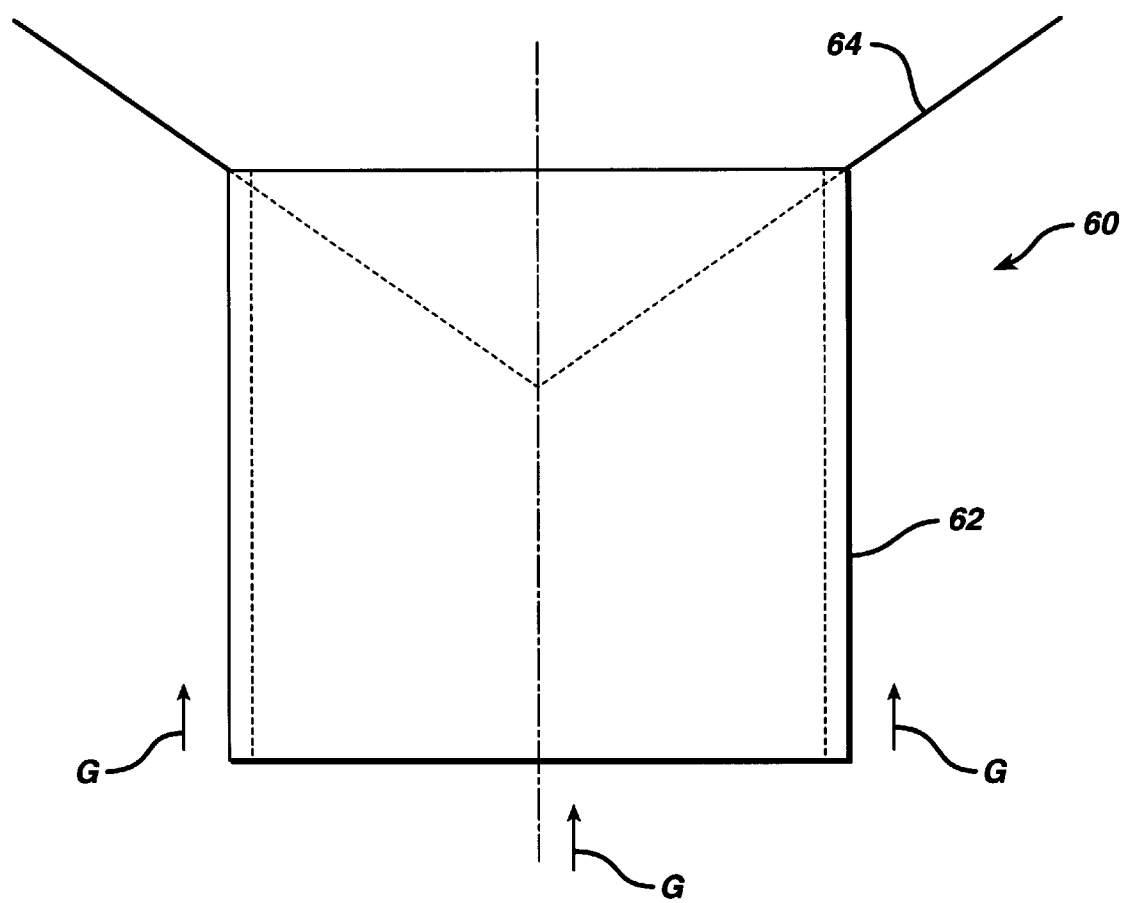
FIG. 6 is a further embodiment of a liquid swirl inducer assembly for use in the apparatus of the present invention.
Figure 7A:
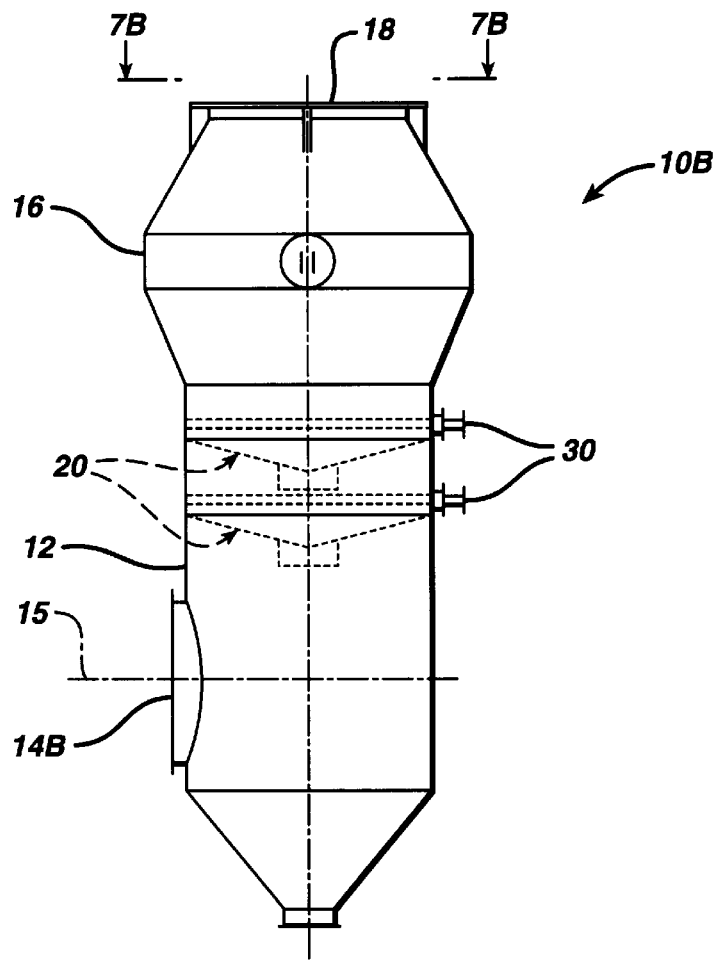
FIGS. 7A and 7B are an elevation and plan view of the apparatus of the present invention wherein the gas inlet is a radial gas inlet.
Figure 7B:
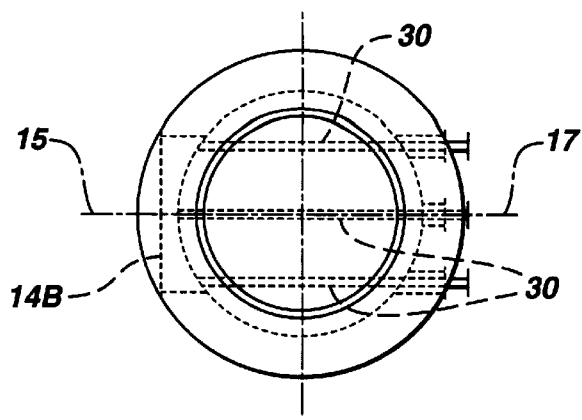

The centrally mounted, pivot tube inducer means 60 (see FIG. 6) is a smooth wall vertical tube 62 mounted to the grid mesh 64 as the above units but does not have any vanes. It is simply a vertical, cylindrical tube of diameter ⅒th to ⅜th the diameter of the grid assembly and at least two tube diameters in length. It induces and controls the swirl through the falling action of the descending liquid alone and would be used where high loadings of solids are present that could stick to and/or plug vanes. It is used primarily where a tangential gas inlet and/or tangential liquid headers are used to induce the spin. Of course the tube is secured to the mesh as described above for the other inducer styles which include the pivot tube.

The vertical pivot tubes for the various inducer styles described may use wall thicknesses of 1/16th inch to 1" thick depending upon the material of construction and the tube size.

For inducers 2, 3, and 4 above, the center (apex) of the cone grid may be removed in the area inside of the inducer tube so that the swirling action is not impeded by the presence of the grid mesh.

Figure 3A:
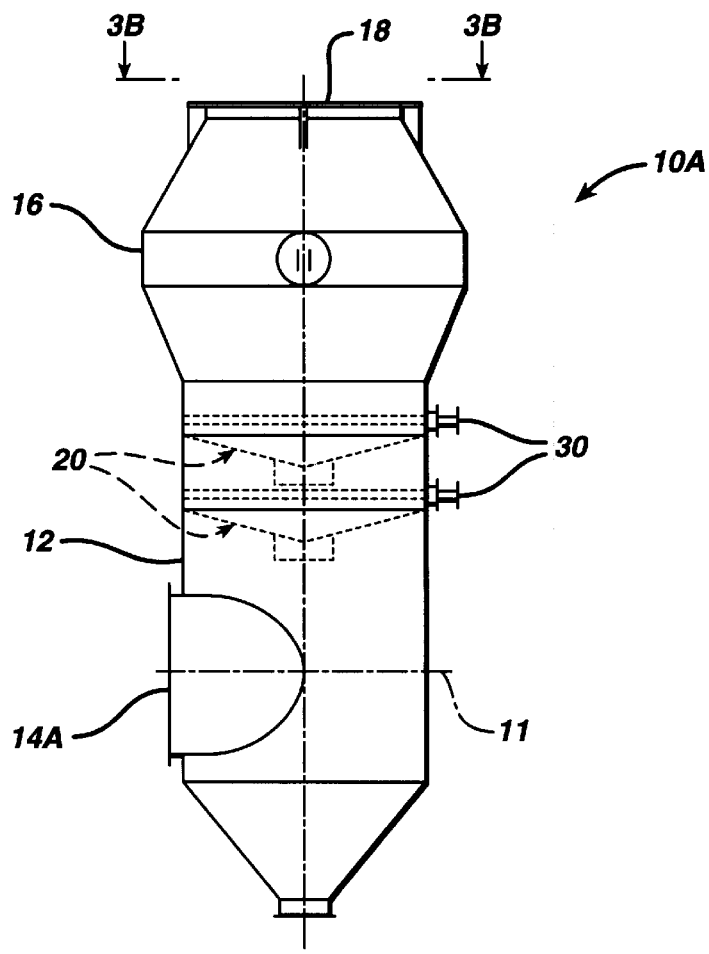
FIGS. 3A and 3B are an elevation and top plan view of the apparatus of the present invention wherein the gas is introduced into the device tangentially.
Figure 3B:
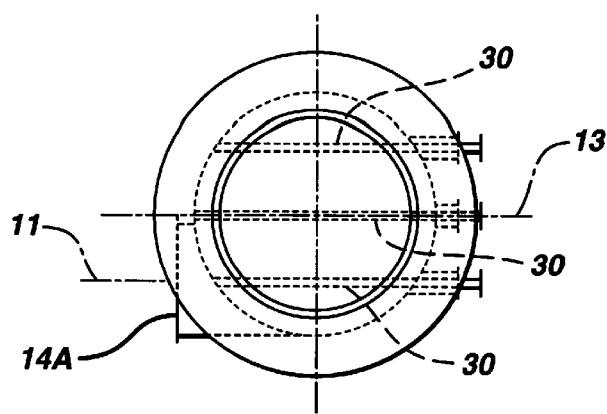

FIGS. 3A and 3B show a typical Coriolis scrubber having a tangential gas inlet wherein the center line 11 of the inlet is off set from the center line 13 of the vessel. The center line 11 of the gas inlet is to the side of the center line of the vessel 13 which results in counter-clockwise movement of the gases as they proceed upwards through the tower, in the northern hemisphere, and on the opposite side of the center line 13 in the southern hemisphere.

FIG. 7 shows a typical vessel configuration with a radial gas inlet and a radial outward vane swirl inducer in place. The center line 15 of the radial gas inlet is co-linear with the center line 17 of the vessel.

The droplet eliminators in the configuration as depicted in either FIGS. 3A and 3B or 7A and 7B are known in the art and do not form a part of the present invention.

As with other fluidized bed scrubbers, it has been reaffirmed that the fluidization height is defined by the net vertical gas velocity component of the moving gas stream through the grid, not by the type of grid or its configuration. In other words, the vertical gas vector velocity component determines the fluidization height of the zone above the grid. In the instant Coriolis effect scrubber, the vertical gas velocity vector component is by definition lower than the gross gas stream velocity vector because the gas is spinning or swirling, and not moving totally vertically.

Evaluating the different methods for inducing a spin to the fluidized zone, it was discovered that if you spin the entering gas, the fluidized bed height is dramatically reduced which increases the local liquid to gas density. This is highly beneficial for particulate removal. Quite unlike the aforementioned catenary grid scrubber, in the present invention where the entering gas is made to spin, it is only the vertical vector component of the spinning gas velocity that determines the fluidized height. For the same entering gas flow rate, the catenary design throws the liquid higher but introduces more gas into the dispersion above the grid thereby reducing the fluidized zone density. Droplets are further apart so particulates can migrate around them and avoid capture. This results in larger bubbles of lower surface area per unit volume which is not preferred. High surface area per unit volume is desired for better mass transfer and this occurs according to the present invention by spinning the entering gas with a tangential gas inlet or radial outward vanes. By adjusting the angle of the vanes and thus the size of the vertical velocity component, the height of the fluidized bed can be varied.

Because of the reduced density as noted above, when you try to induce the water to spin, it does so, but very slowly. The vigorous agitation above the grid tends to break up any spiral pattern. This is beneficial however, since the center pivot tube and inducer tends to lend stabilty (lack of stability is a problem, sometimes major, in the catenary grid scrubber) to the fluidized bed. It tends to rotate about the center axs defined by the centrally mounted inducer.

For a higher (deeper) fluidized bed, inducer styles 3 and 4 are employed. With these type swirl inducers, the entering gas velocity is redirected vertically so that there is an adjustment of the vertical velocity. Thus the use of radially inward vanes within the pivot tube or use of a pivot tube.

The higher fluidized bed will enhance gas absorption. Rotating and swirling the fluidized bed permits gas flow rate reductions, or turndown ratios of upwards of 40%, far greater than other axially fluidized devices. This occurs since only the vertical gas velocity component contributes to the fluidized bed depth and it is typically the vertical velocity multiplied by the sine of the vane angle of the swirl inducer.

The intent of the device of the invention is not to rotate the ebulating or fluidized zone too rapidly. Doing so would excessively force liquid to the side wall of the containing vessel and would limit the ability to use multiple grids in series (one would have to redirect the liquid from an upper grid back onto the grid below using some energy consuming mechanism which is to be avoided). Rotating slowly using the Coriolis effect allows the liquid to drain while maintaining adequate dispersion for the possible use of a grid assembly below. If multiple grid assemblies are used, they should be spaced apart by at least 6". Trials have shown that 24" spacing provides the best performance and allows service access to the individual grid assemblies.

While various embodiments of the invention have been shown and described herein it is obvious that numerous additions, changes and omissions may be made to the embodiments without departing from the spirit and scope of the invention as set forth in the following claims.

What is claimed is:

1. A gas and liquid counter flow contact apparatus comprising:
   a. a vertically orientated containing vessel including a sidewall;
   b. at least one grid assembly including at least one grid member having a surface, said grid member including a plurality of openings defining a total open area positioned within said containing vessel transverse to and concentric about a vertical center line of said containing vessel;
   c. means for injecting a liquid at a specified liquid flow rate into said containing vessel;
   d. means for injecting a gas at a specified flow rate into said containing vessel, said plurality of openings of said grid member sufficient in total open area to permit a flow of said injected gas therethrough at a rate sufficient to create a fluidized zone at and above the surface of said grid member, throuh the interaction with the injected liquid, said fluidized zone having a liquid component and a gas component; and
   e. means for inducing a rotation of said fluidized zone in the direction of and under the influence of the Coriolis effect at the geographical point of use of said apparatus, whereby a stabilized, swirling fluidized zone results, and whereby said total open area is sufficient to penmit substantially all of said liquid component of said fluidized zone to purposely, randomly drain through said plurality of openings of said grid member, counter to the direction of said gas simultaneously passing through said plurality of openings of said grid member to thereby effect a cleansing of said grid member surface during the operation of said contact apparatus.

2. The gas and liquid contact apparatus claimed in claim 1 wherein said grid assembly includes at least one grid mesh, said grid mesh formed having a cone shape.

3. The gas and liquid contact apparatus claimed in claim 2 wherein said grid assembly includes a grid mesh having approximately 50 to 80 percent open area when laid flat.

4. The gas and liquid contact apparatus claimed in claim 2 wherein the cone angle of said cone shaped grid mesh, is at least 5 degrees from the horizontal.

5. The gas and liquid contact apparatus claimed in claim 4 wherein said cone angle is in the range between 10 and 40 degrees from the horizontal.

6. The gas and liquid contact apparatus claimed in claim 1 wherein said means for injecting a liquid at a specified liquid flow rate into said containing vessel include at least one horizontal header disposed above said grid assembly, said horizontal header including a plurality of holes spaced in a pre-determined arrangement along the length of said header to produce a uniform pattern of the liquid above said grid assembly.

7. The gas and liquid contact apparatus claimed in claim 1 wherein said means for inducing a rotation of said fluidized zone includes means for tangentially offsetting the means for injecting a gas into said vessel from a horizontal center line of said vessel in a direction whereby said gas enters said vessel in the direction of the Coriolis rotational effect at the geographical point of use of said apparatus.

8. The gas and liquid contact apparatus claimed in claim 1 wherein said means for inducing a rotation of said fluidized zone include:
   a. a centrally disposed pivot tube secured to said grid assembly and having a vertical center line colinear with the vertical center line of said containing vessel and said grid assembly; and,
   b. a plurality of radially outward vanes disposed upon an outside surface of said pivot tube, said outward vanes disposed at a predetermined angle off of the vertical.

9. The gas and liquid contact apparatus claimed in claim 1 wherein said means for inducing a rotation of said fluidized zone include:
   a. a centrally disposed pivot tube secured to said grid assembly and having a vertical center line colinear with the vertical center line of said containing vessel and said grid assembly; and,
   b. a plurality of radially inward vanes disposed upon an inside surface of said pivot tube said inward vanes disposed at a predetermined angle off of the vertical.

10. The gas and liquid contact apparatus claimed in claim 1 wherein said means for inducing a rotation of said fluidized zone include:
   a centrally disposed pivot tube secured to said grid assembly, said pivot tube having a predetermine length and diameter and having a vertical center line colinear with the vertical center line of said containing vessel and said grid assembly when secured to said grid assembly, said predetermined length and diameter sufficient to result in said rotation of said fluidized zone due to the Coriolis effect at the geographical point of use of said apparatus.

* * * * *

UNITED STATES PATENT AND TRADEMARK OFFICE
CERTIFICATE OF CORRECTION

PATENT NO. : 6,007,055
DATED : December 28, 1999
INVENTOR(S) : Kenneth C. Schifftner It is certified that error appears in the above-identified patent and that said Letters Patent is hereby corrected as shown below:

Column 9, line 44, change the word "throuh" to --through--.

Column 9, line 51, change the word "penmit" to --permit--.

Signed and Sealed this

Fifteenth Day of August, 2000

Attest:

Q. TODD DICKINSON

Attesting Officer

Director of Patents and Trademarks